(12) United States Patent
Fu et al.

(10) Patent No.: US 10,887,433 B2
(45) Date of Patent: Jan. 5, 2021

(54) SYSTEM AND METHOD FOR INCREMENTAL DATA PROCESSING

(71) Applicant: Pony AI Inc., Grand Cayman (KY)

(72) Inventors: Haoying Fu, Fremont, CA (US);
Mengda Yang, Sunnyvale, CA (US);
Xiang Yu, Santa Clara, CA (US);
Tiancheng Lou, Milpitas, CA (US);
Jun Peng, Fremont, CA (US); Sinan Xiao, Mountain View, CA (US); Tianyi Li, San Jose, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 484 days.

(21) Appl. No.: 15/944,486

(22) Filed: Apr. 3, 2018

(65) Prior Publication Data
US 2019/0306284 A1 Oct. 3, 2019

(51) Int. Cl.
*G01S 17/931* (2020.01)
*G06N 20/00* (2019.01)
*G01S 7/4861* (2020.01)
*H04L 29/06* (2006.01)

(52) U.S. Cl.
CPC ............ *H04L 69/22* (2013.01); *G01S 7/4861* (2013.01); *G01S 17/931* (2020.01); *G06N 20/00* (2019.01)

(58) Field of Classification Search
CPC ....... H04L 69/22; G06N 20/00; G01S 7/4861; G01S 17/89; G01S 17/931
See application file for complete search history.

(56) References Cited

U.S. PATENT DOCUMENTS

| | | | |
|---|---|---|---|
| 5,319,611 A | * | 6/1994 | Korba ................. G01S 7/52003 367/909 |
| 9,111,444 B2 | | 8/2015 | Kaganovich |
| 10,012,723 B2 | | 7/2018 | Lindskog |
| 10,108,867 B1 | * | 10/2018 | Vallespi-Gonzalez ....................... G01S 17/89 |
| 10,255,525 B1 | * | 4/2019 | Totolos, Jr. ........... B60W 30/09 |
| 10,684,372 B2 | * | 6/2020 | Jensen .................... G01S 17/06 |
| 2010/0204974 A1 | | 8/2010 | Israelsen |
| 2015/0266488 A1 | * | 9/2015 | Solyom ............. B60W 50/0205 701/28 |
| 2017/0227647 A1 | * | 8/2017 | Baik ....................... G01S 19/42 |
| 2018/0111617 A1 | * | 4/2018 | Stahl ..................... B60W 30/16 |
| 2018/0143324 A1 | | 5/2018 | Keilaf |
| 2018/0189574 A1 | * | 7/2018 | Brueckner ......... G06K 9/00791 |
| 2019/0041522 A1 | * | 2/2019 | Slutsky .................. G01S 17/86 |
| 2019/0051056 A1 | * | 2/2019 | Chiu ......................... G06T 7/11 |
| 2019/0243372 A1 | * | 8/2019 | Huval .................... G08G 1/167 |
| 2019/0271780 A1 | * | 9/2019 | Bravo Orellana ...... G01S 17/89 |
| 2020/0166945 A1 | * | 5/2020 | Kim ..................... G05D 1/0231 |

* cited by examiner

*Primary Examiner* — Gregory J Toatley, Jr.
*Assistant Examiner* — Lynda Dinh
(74) *Attorney, Agent, or Firm* — Sheppard Mullin Richter & Hampton LLP

(57) ABSTRACT

Systems and methods are provided for segmenting a data frame to be acquired into a number of incremental data of equal data length. A first incremental data of the data frame can be acquired from one or more sensors. The first incremental data of the data frame can be processed while a next incremental data of the data frame is being acquired from the one or more sensors. The acquiring and processing of incremental data of the data frame can continue until a last incremental data of the data frame is acquired and processed. Processed incremental data can be outputted as a processed data frame.

17 Claims, 8 Drawing Sheets

SYSTEM AND METHOD FOR INCREMENTAL DATA PROCESSING

BACKGROUND

Under conventional approaches, throughputs of data acquisition systems may be limited by speed at which data are acquired (e.g., by a LiDAR system) and subsequently processed. In typical data processing techniques, processing of data does not initiate until a data frame, e.g., a complete data file, is acquired first. For example, a data acquisition system can acquire a data frame in 0.5 seconds and process the data frame in another 0.5 seconds. In this example, the throughput of the data acquisition system is one data frame every second, or 1 Hz. Alternatively, data latency (e.g., time to acquire and process a frame of data) of the data acquisition system is one second. Depending on an environment at which a data acquisition is deployed, data latency can be problematic.

SUMMARY

Various embodiments of the current disclosure can include systems, methods, and non-transitory computer readable media configured to segment a data frame to be acquired into a number of incremental data of equal data length. A first incremental data of the data frame can be acquired from one or more sensors. The first incremental data of the data frame can be processed while a next incremental data of the data frame is being acquired from the one or more sensors. The acquiring and processing of incremental data of the data frame can continue until a last incremental data of the data frame is acquired and processed. Processed incremental data can be outputted as a processed data frame.

In some embodiments, that data frame can correspond to a 360 degree scan of an environment. In some embodiments, the incremental data of the data frame can correspond to an arc of the 360 degree scan of the environment, the arc being proportional to ratio of the incremental data to the data frame.

In some embodiments, segmenting the data frame to be acquired into the number of the incremental data can be user selectable.

In some embodiments, the processed data frame can be a three dimensional map of an environment, the three dimensional map can comprise relative distances of one or more objects in the environment.

In some embodiments, one or more objects in the incremental data of the data frame can be identified using one or more machines learning techniques. The one or more objects can be analyzed, using one or more machine learning techniques, with previously identified objects from a previous incremental data of a previous data frame to determine relative motion of the one or more objects.

In some embodiments, the one or more objects can be identified from the previous incremental data of the previous data frame. Relative movements of the one or more objects between data frames can be determined using some indicator and using one or more machine learning techniques. Based on the relative motion of the one or more objects, one or more incremental data can be identified to be minimally processed in a next data frame to be acquired.

In some embodiments, the one or more objects can be identified from the previous incremental data of the previous data frame. Using some indicator and using one or more machine learning techniques, the one or more objects can be determined to have not moved between data frames. One or more incremental data can be identified to bypass processing in a next data frame to be acquired.

In some embodiments, one or more processed incremental data of the data frame can be reassembled into the processed data frame.

In some embodiments, the one or more sensors can be LiDAR sensors.

In some embodiments, the LiDAR sensors can be rotatable about an axis.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
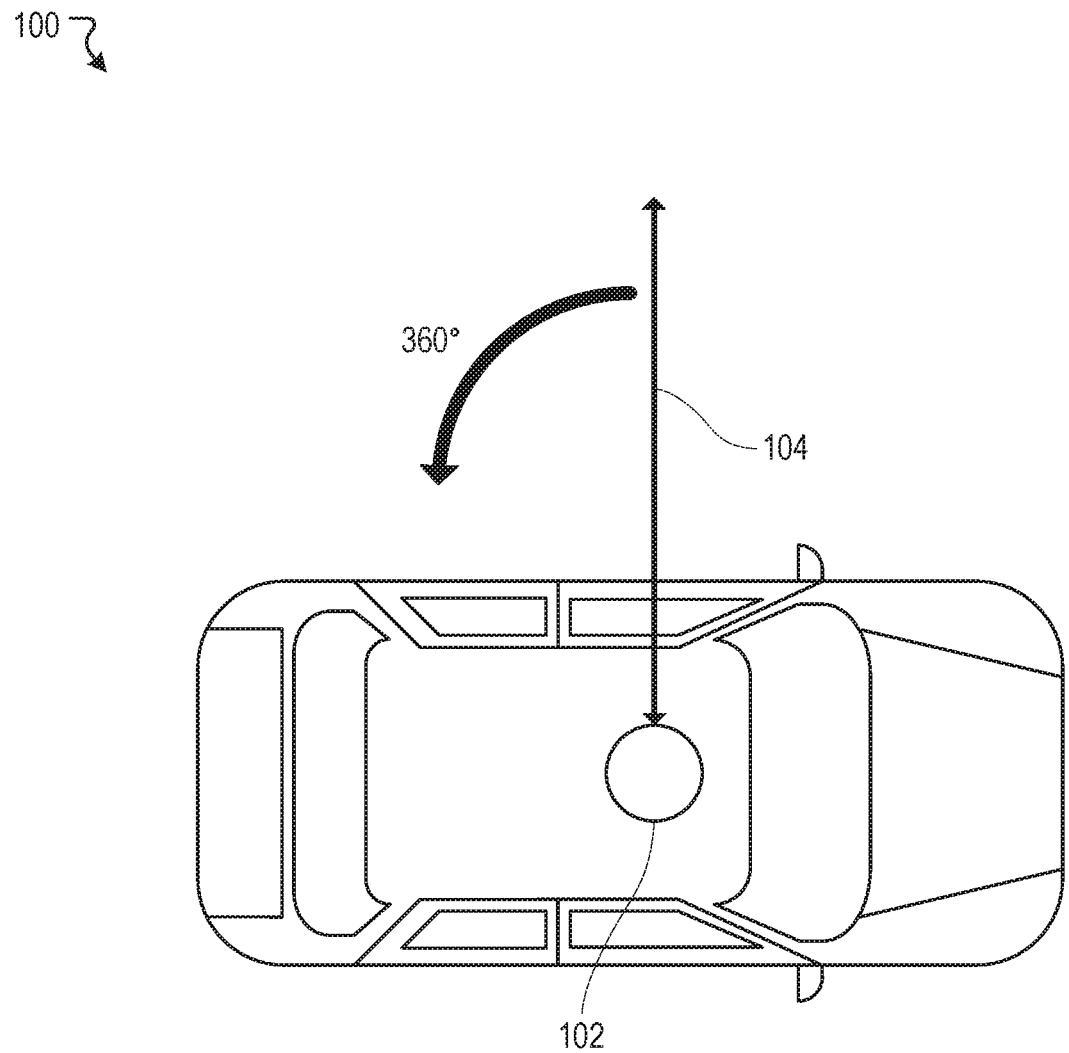
FIG. 1 illustrates an example autonomous vehicle, according to various embodiments of the current disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Throughputs are a measure of how fast data acquisition systems can output processed data. Throughputs are especially important in data acquisition systems of autonomous vehicles. For example, these data acquisition systems must acquire as much data and process data as fast as possible to help an autonomous vehicle make split-second driving decisions (e.g., accelerate, brake, right-turn, left-turn, etc.). As such, it is of critical importance to improve throughputs (or reduce data latencies) of data acquisitions systems.

Under conventional approaches, throughputs of data acquisition systems are limited by speed at which data are acquired and subsequently processed. In a typical data processing scenario, processing of data does not begin until a data frame (e.g., a complete data file) is first acquired. For example, a data acquisition system can acquire a data frame in 0.5 seconds and process the data frame in another 0.5 seconds. In this example, the throughput of the data acquisition system is one processed data frame every second, or 1 Hz. Also in this example, data latency of the data acquisition system is one second (i.e., time it takes for the data acquisition system to output one processed data frame). Hence, to improve throughput of a data acquisition system, data latency of the data acquisition system needs to be reduced. To reduce the data latency, either data acquisition time or data processing time ought to be reduced.

A claimed solution rooted in computer technology overcomes problems specifically arising in the realm of computer technology. In various embodiments, a data acquisition system can process data as the data is concurrently being acquired. In some embodiments, a data frame can be segmented, divided, or split into any number of incremental data of equal data length. For instance, a data frame can be divided into two, four, or eight incremental data equal in data length. The data acquisition system can acquire an incremental data of a data frame. The data acquisition system can process the incremental data of the data frame while another incremental data of the data frame is being acquired. This acquiring and processing of incremental data of the data frame continue until a last incremental data of the data frame is acquired and processed. In some embodiments, the data acquisition system can perform further analysis to determine if full data processing are needed for one or more incremental data in a next data frame to be acquired.

FIG. 1 illustrates an example autonomous vehicle 100, according to various embodiments of the current disclosure. An autonomous vehicle 100 generally refers to a category of vehicles that are capable of "sensing" an environment around the autonomous vehicle 100. The autonomous vehicle 100 may include myriad of sensors (e.g., camera, sonar, radar, LiDAR, GPS, etc.) to detect and identify objects in the surrounding environment (e.g., pedestrians, road signs, traffic light, traffic conditions, etc.). In some embodiments, the autonomous vehicle 100 may recognize road signs (e.g., speed limit, school zone, construction zone, etc.) and traffic lights (e.g., red light, yellow light, green light, etc.). The autonomous vehicle 100 may navigate through various road, street, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on a conventional vehicle. The autonomous vehicle 100 can also sense environmental conditions, gauge spatial relationships (e.g., distances between objects and itself), detect and analyze road signs just as a human driver can. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include laser scanning systems (e.g., LiDAR), radar systems, sonar systems, camera systems, and/or the like. The one or more sensors allow the autonomous vehicle 100 to sense an environment around the autonomous vehicle 100. For example, radar or sonar system can be configured to detect a distance of an object in front of the autonomous vehicle 100 using doppler effect of electromagnetic or sound waves respectively. In another example, camera systems can be configured to capture images and process captured images to detect objects, such as road signs, and deciphering meaning of the objects, such as speed limit posted on the road signs.

In some embodiments, the autonomous vehicle 100 may include a light detection and ranging (e.g., LiDAR or lidar) sensor 102. The LiDAR sensor 102 may be mounted on any suitable locations on the autonomous vehicle 100 as long as the locations are free of obstructions that may interfere with operation of lasers. For example, in some embodiments, one or more LiDAR sensors can be mounted on A-pillars (e.g., pillars that holds a front windshield of an automobile) of the autonomous vehicle 100. In another example, as shown in the example of FIG. 1, the LiDAR sensor 102 may be mounted on a top or a roof of the autonomous vehicle 100. In general, the LiDAR sensor 102 can be utilized to survey an environment surrounding the autonomous vehicle 100 by measuring relative distances between objects in the environment and the autonomous vehicle 100. The LiDAR sensor 102 does this by illuminating pulsed laser lights 104 and measuring the same pulsed laser lights 104 reflected off from the objects. In various embodiments, the LiDAR sensor 102 can include one or more laser lights (e.g., number of channels in the LiDAR sensor 102) along an axis perpendicular to the ground (e.g., a vertical axis of the autonomous vehicle 100). In such embodiments, the one or more channels of the laser lights allow the LiDAR sensor 102 to get a two dimensional "view," or a two dimensional map, of the surrounding environment along the vertical axis of the autonomous vehicle 100. In some embodiments, the LiDAR sensor 102 can be configured to rotate 360 degrees about a rotational axis to scan the surrounding environment. For example, as shown in the example of FIG. 1, the LiDAR sensor 102 mounted on the top of the autonomous vehicle 100 can rotate 360 degree. The rotation and the one or more channels of the laser lights enable the LiDAR sensor 102 to capture a three dimensional "view," or a three dimensional map, of the objects in the surrounding environment by measuring relative distances of the objects to the LiDAR sensor 102.

As discussed, the LiDAR sensor 102 can be configured to acquire three dimensional maps of objects in a surrounding environment. In some embodiments, the LiDAR sensor 102 can be configure to rotate at 10 Hz (e.g., 10 rotations per second). In some embodiments, the LiDAR sensor 102 can be configured to rotate at a speed that is faster or slower than 10 Hz. In general, the rotational speed of the LiDAR sensor 102 is limited by its hardware, meaning that a LiDAR sensor 102 can rotate as fast as the hardware allows. In various embodiments, a data frame (e.g., a frame of a point cloud data) of the LiDAR sensor 102 comprises one 360 degree scan of the surrounding environment. For example, if the LiDAR sensor 102 rotates at 10 Hz, the LiDAR sensor 102 can acquire or capture ten data frames, or ten 360 degree scans of the surrounding environment, a second (theoretically, assuming no data processing are required). In general, a data frame can be segmented, divided, or split into one or more incremental data. For example, the data frame can be segmented, divided, or split into two incremental data with each incremental data having a same data length as one another. Further, in this example, each incremental data represents a 180 degree scan of the surrounding environment (e.g., an one-half of the 360 degree scan). In another example, the data frame can be segmented, divided, or split into four incremental data. Each incremental data, in this example, corresponds to a 90 degree scan of the surrounding environment (e.g., a quarter of the 360 degree scan). In general, as a data frame is segmented into more and more incremental data, each incremental data represents a smaller angular representation of the surrounding environment. Also, in general, the angular representation of the surrounding environment is proportional to ratio of the incremental data to the data frame. Many variations of segmentation are possible. Many variations are contemplated.

In various embodiments, acquired data frames (or the acquired frames of the point cloud data) need to be further processed in order for the autonomous vehicle 100 to derived meaningful information from the acquired data frames. For example, distances that a pulsed laser light 104 has traveled can be determined by measuring the time the pulsed laser light 104 took to travel forward and back from the objects in the surrounding environment. This information can then be used to determine distances between the objects and the LiDAR sensor 102 using speed of light as a conversion factor. In general, time to process data needs to be added to the time to acquire data. For instance, in the example in which the LiDAR sensor 102 acquires a data frame at 10 Hz, one data frame is acquired or captured every 100 milliseconds. Further, if a data acquisition system takes another 100 milliseconds to process the data frame, the data acquisition system has a throughput of 5 Hz (e.g., five processed data frames a second). Alternatively, the data acquisition system has a data latency of 200 milliseconds. Therefore, in this example, although the LiDAR sensor 102 can acquire or capture data frames at 10 Hz, the throughput of the LiDAR system (the LiDAR sensor 102 plus the data acquisition system) is 5 Hz. Throughputs are described in more detail herein with respect to FIGS. 3A-3C.

Although most of the discussion focuses on data acquisition systems associated with LiDAR sensors, the disclosed inventions are not limited just to such a system. The disclosed inventions can be applied to any suitable data acquisition systems of any suitable sensors and/or devices in which at least some data is acquired from the sensors and/or devices. For example, the disclosed inventions can be applied to image data acquired from cameras.

Figure 2:
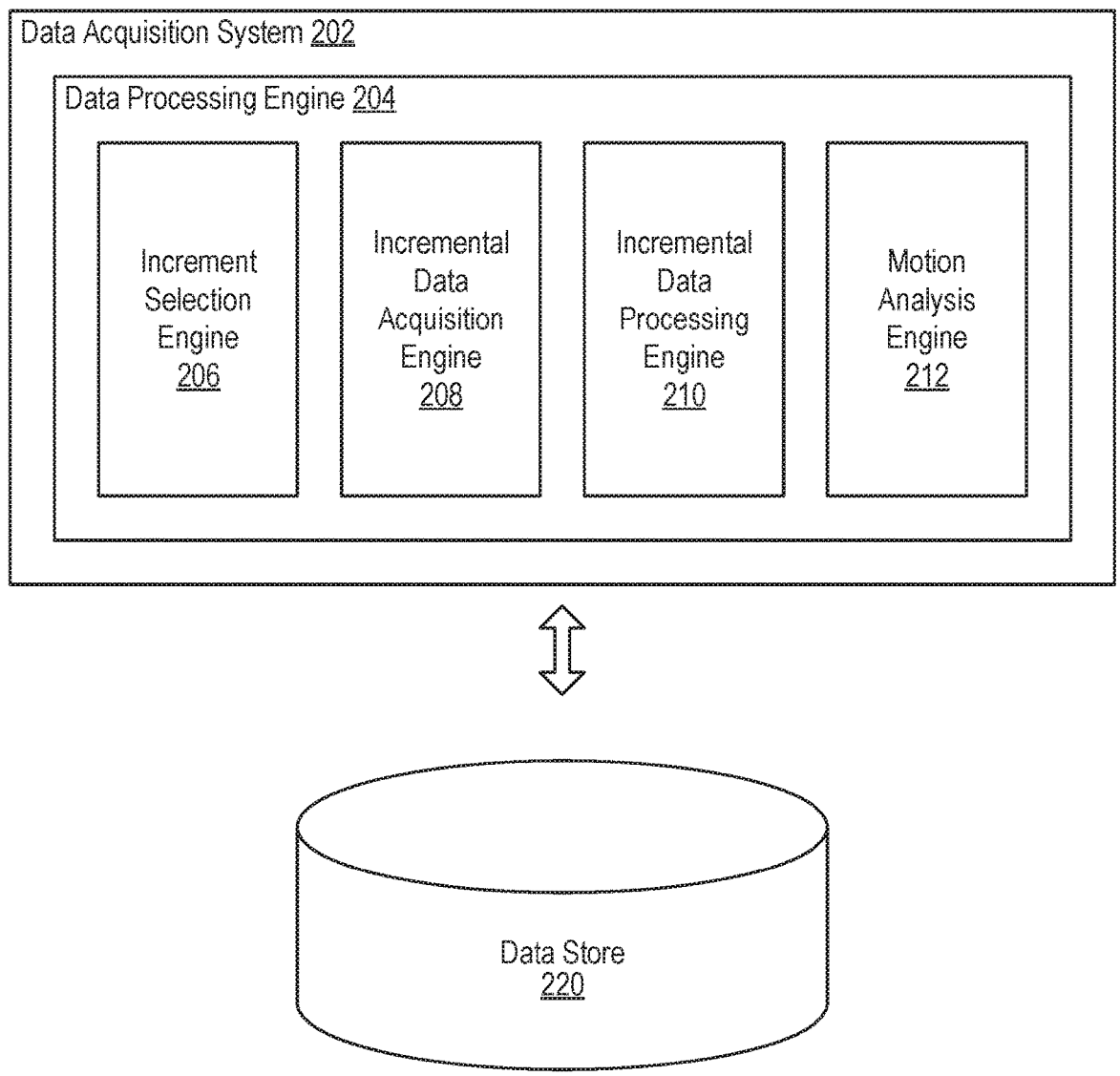
FIG. 2 illustrates an example environment for data processing, according to various embodiments of the current disclosure.

FIG. 2 illustrates an example environment 200 for data processing, according to various embodiments of the current disclosure. The example environment 200 can include at least one data acquisition system 202 that includes one or more processors and memory. The processors can be configured to perform various operations by interpreting machine-readable instructions. In general, the data acquisition system 202 can be configured to acquire data and process the acquired data using the processor(s). In some embodiments, the data acquisition system discussed with respect to FIG. 1 can be implemented as the data acquisition system 202. As shown in FIG. 2, in some embodiments, the data acquisition system 202 can include a data processing engine 204 that can further include an increment selection engine 206, an incremental data acquisition engine 208, an incremental data processing engine 210, and a motion analysis engine 212. In various embodiments, the data processing engine 204 can be configured to acquire and process incremental data of a data frame from one or more sensors.

In some embodiments, the environment 200 may also include at least a data store 220 that is accessible to the data acquisition system 202. In some embodiments, the data store 220 can be configured to store parameters or data pertaining to the increment selection engine 206, the incremental data acquisition engine 208, the incremental data processing engine 210, and the motion analysis engine 212.

Although not shown in the example environment 200 of FIG. 2, in various embodiments, the data acquisition system 202 can be configured to interface with one or more sensors and/or devices of an autonomous vehicle (e.g., such as the autonomous vehicle 100 of FIG. 1). In general, the data acquisition system 202 can be electrically and/or communicatively coupled, via the data processing engine 204, to the one or more sensors and/or devices of the autonomous vehicle. The data processing engine 204 may transmit/receive various data to and from the one or more sensors and/or devices using any suitable communication protocols. For example, the data processing engine 204 may be electrically coupled to the one or more sensors and/or devices via routers, cables, communication buses, and any other network topologies. In another example, the data processing engine 204 may be communicatively coupled to the one or more sensors and/or devices via IEEE 802.15 (e.g., wireless personal area network), 802.11 (e.g., wireless local area network or WiFi), or 802.3 (e.g., local area network or Ethernet) protocols. Many variations are possible. In some embodiments, the data processing engine 204 can be electrically and communicatively coupled to a LiDAR sensor (e.g., such as the LiDAR sensor 102 of FIG. 1). The data processing engine 204 can be configured to receive data frames or frames of point cloud data from the LiDAR sensor. In general, a LiDAR system refers for a system comprising a LiDAR sensor electrically and/or communicatively coupled to a data acquisition system, such as the data acquisition system 202.

In various embodiments, the increment selection engine 206 can be configured to select an incremental data to be segmented, divided, or split from a data frame to be acquired from a sensor or a device (e.g., a LiDAR sensor). In some embodiments, the incremental data of the data frame to be acquired is user selectable. For example, upon a user selection, a data frame can be segmented into two incremental data of equal data length or size. In another example, the data frame can be segmented into four incremental data upon another user selection. In general, the data frame can be segmented, divided, or split into any suitable number of incremental data. In some embodiments, user selection of incremental data can be stored in the data store 220. Further details of increment selection engine 206 are described herein with respect to FIGS. 3A-3C.

The incremental data acquisition engine 208, in various embodiments, can be configured to acquire incremental data of a data frame. The incremental data acquisition engine 208 acquires or captures one incremental data of a data frame at a time, instead of acquiring a full data frame at a time. In some embodiments, the incremental data acquisition engine 208 can interface with the increment selection engine 206 to receive user increment selection information. In other embodiments, the incremental data acquisition engine 208 can interface with the data store 220 to obtain user increment selection information.

In some embodiments, the incremental data acquisition engine 208 can interface with the LiDAR sensor to receive continuous data frames. In such embodiments, the incremental data acquisition engine 208 can keep track of the continuous data frames and segment, divide, or split the continuous data frames in to discrete data frames with each discrete data frame corresponding to a 360 degree scan of an environment. Further, the incremental data acquisition engine 208 can segment, divide, or split each discrete data frames based on the user selected increment. As such, in some embodiments, the incremental data acquisition engine 208 can be configured to acquire two incremental data per data frame from the LiDAR sensor, with each incremental data corresponds to a 180 degree scan of the environment. In some embodiments, the incremental data acquisition engine 208 can be configured to acquire four incremental data per data frame from the LiDAR sensor, with each incremental data corresponds to a 90 degree scan of the environment. Many variations are possible. For example, the incremental data acquisition engine 208 can be configured to acquire ten incremental data per data frame, fifteen incremental data per data frame. In general, an arc of the 360 degree scan is proportional to ratio of the incremental data to the data frame. In some embodiments, the acquired incremental data can be stored in the data store 220 to be later accessed by the incremental data processing engine 210. Further details on incremental data acquisition engine 208 are described herein with respect to FIGS. 3A-3C.

In various embodiments, the incremental data processing engine 210 can be configured to process incremental data of a data frame acquired from the incremental data acquisition engine 208. The incremental data processing engine 210 processes one incremental data of a data frame at a time, instead of processing a full data frame at a time. In some embodiments, the incremental data processing engine 210 can interface with the incremental data acquisition engine 208 to receive the acquired incremental data. In other embodiments, the incremental data processing engine 210 can received the acquired incremental data from the data store 220. As such, in some embodiments, the incremental data processing engine 210 can be configured to process two incremental data per data frame, one incremental data at a time. In some embodiments, the incremental data processing engine 210 can be configured to process four incremental data per data frame, one incremental data at a time. Similarly, here, the incremental data processing engine 210 can be configured to process any number of incremental data of a data frame. In some embodiments, the processed incremental data can be stored in the data store 220 to be later accessed by the motion analysis engine 212. In general, the incremental data processing engine 210 processes the acquired incremental data to determine a three dimensional map corresponding to an arc of an environment represented in the acquired incremental data. In some embodiments, the incremental data processing engine 210 can be configured to determine relative distances of objects in the incremental data. Further details of incremental data processing engine 210 are described herein with respect to FIGS. 3A-3C.

In some embodiments, the incremental data processing engine 210 can be configured to reassemble or reconstruct processed incremental data of a data frame into a processed data frame. For example, in the case of the two incremental data in a data frame, the incremental data processing engine 210 can reassemble or reconstruct the two incremental data back into a single processed data frame. In another example, in the case of the four incremental data in a data frame, the incremental data processing engine 210 can reassemble or reconstruct the four incremental data back into a single processed data frame. The incremental data processing engine 210 can subsequently output the processed data frame to other systems of an autonomous vehicle or store the processed data frame into the data store 220 to be later accessed by the other systems of the autonomous vehicle.

As discussed, for an autonomous vehicle to derive meaningful information, acquired data must be further processed. For example, acquired incremental data of a data frame must be further processed to identify objects in the acquired incremental data of the data frame. The motion analysis engine 212, in various embodiments, can be configure to identify objects in each of the processed incremental data of the data frame. In some embodiments, the motion analysis engine 212 can interface with the incremental data processing engine 210 to access the processed incremental data of the data frame. In other embodiments, the motion analysis engine 212 can interface with the data store 220 to access the processed incremental data of the data frame. The motion analysis engine 212 can, based on one or more machine learning techniques, identified objects in the processed incremental data. For example, the motion analysis engine 212, using the one or more machine learning techniques, can identify pedestrians, vegetation, road signs, etc. associated with each incremental data. Each incremental data represents an arc of an environment around the autonomous vehicle. As discussed, the arc is proportional to ratio of the incremental data and the data frame. The motion analysis engine 212 can also obtain relative distance information from the vehicle to the pedestrians, vegetations, road signs, etc. from the incremental data processing engine 210.

In some embodiments, the motion analysis engine 212 can determine relative motion of objects between incremental data of different data frames. For example, objects associated with a first incremental data of a first data frame are identified. In a first incremental data of a second data frame, the same objects associated with the first incremental data of the first data frame are identified. The motion analysis engine 212, using indicators such as direction and speeds of the autonomous vehicle, and using one or more data processing or machine learning techniques, can determine whether the identified objects in the first incremental data of the second data frame had moved or not relative to the first incremental data of the first data frame. In this example, if the motion analysis engine 212 determines that the identified objects had not moved from the one data frame to the next, the motion analysis engine 212 can instruct the incremental data processing engine 210 to perform a quick data processing on a first incremental data of a next data frame (e.g., a third data frame) instead of performing a full data processing. Therefore, in general, when a scene around an autonomous vehicle is slow moving, data processing time can be further reduced to improve data latency. Further details of the motion analysis engine 212 are described with more specificity herein with respect the FIG. 4.

In some instances, when a scene around an autonomous vehicle does not change between data frames, the motion analysis engine 212 can instruct the incremental data processing engine 210 not to process a next data frame to be acquired. In such instances, since no data processing is needed, processing power can be diverted to other systems on the autonomous vehicle. In some instances, if objects or scene within a particular incremental data does not change between data frames, the motion analysis engine 212 can instruct the incremental data processing engine 210 not to process the particular incremental data of a next data frame to be acquired. In such instances, since no incremental data processing is needed, processing power can be diverted to other systems on the autonomous vehicle.

In some embodiments, the motion analysis engine 212 can predictively optimize incremental data processing. For example, between incremental data of successive data frames, the motion analysis engine 212 can determine whether objects associated with the incremental data are approaching or becoming more distant. In this example, if the objects are approaching, the motion analysis engine 212 instructs the incremental data processing engine 210 to process incremental data corresponding to the object more frequently. Whereas, if the objects are becoming more distance, the motion analysis engine 212 instructs the incremental data processing engine 210 to process incremental data corresponding to the object less frequently.

In some embodiments, the motion analysis engine 212 can work in conjunction with the incremental data processing engine 210 to reduce file size of data frames (e.g., point cloud data). For example, as discussed, the motion analysis engine can analyze relative motion of objects associated with data frames. Based on the extent of the object's motion, the motion analysis engine 212 can instruct the incremental data processing engine 210 to either perform a quick processing or bypass processing altogether. In this example, if no processing of incremental data is needed, the motion analysis engine 212 can instruct the incremental processing engine 210 not reconstruct or reassemble the incremental data into a data frame, thereby reducing the file size of the data frame.

Figure 3A:
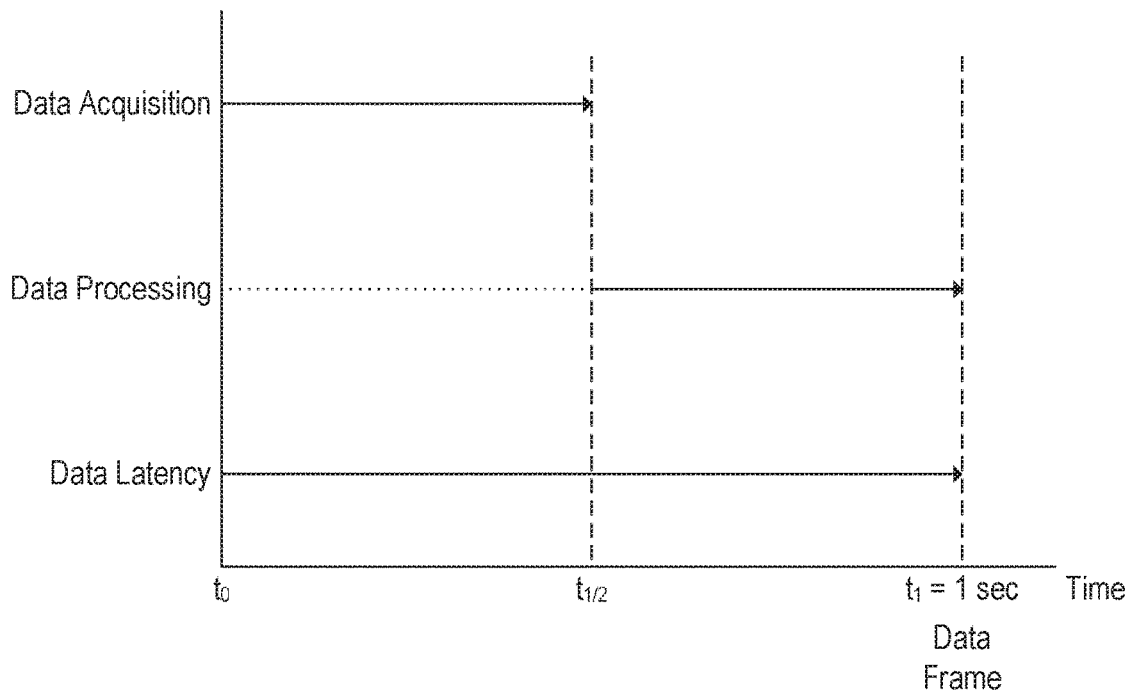
FIG. 3A illustrate an example diagram, according to various embodiments of the current disclosure.

FIG. 3A illustrate an example diagram 300, according to various embodiments of the current disclosure. In this example diagram 300, a horizontal axis (e.g., x-axis) represents time and a vertical axis (e.g., y-axis) represents various factors that contribute to data latency. As depicted in FIG. 3A, there are two contributors to data latency: data acquisition and data processing. As discussed with respect to FIG. 2, data acquisition time can be associated with time needed to acquire an incremental data of a data frame by the incremental data acquisition engine 208, for example. Data processing time can be associated with time needed to process the acquired incremental data by the incremental data processing engine 210, for example.

FIG. 3A depicts a scenario in which a full data frame is being acquired by a LiDAR system (e.g., a LiDAR sensor plus a data acquisition system). In this example diagram 300, a full data frame is not segmented, divided, or split into a number of incremental data. In the example diagram 300, time to acquire a full data frame is $t_{1/2}$ (e.g., 0.5 seconds) and time to process the acquired full data frame is another $t_{1/2}$ (e.g., 0.5 seconds). Therefore, data latency of the LiDAR system is one second. In this example diagram 300, throughput of the LiDAR system is one processed data frame for every second, or 1 Hz.

Figure 3B:
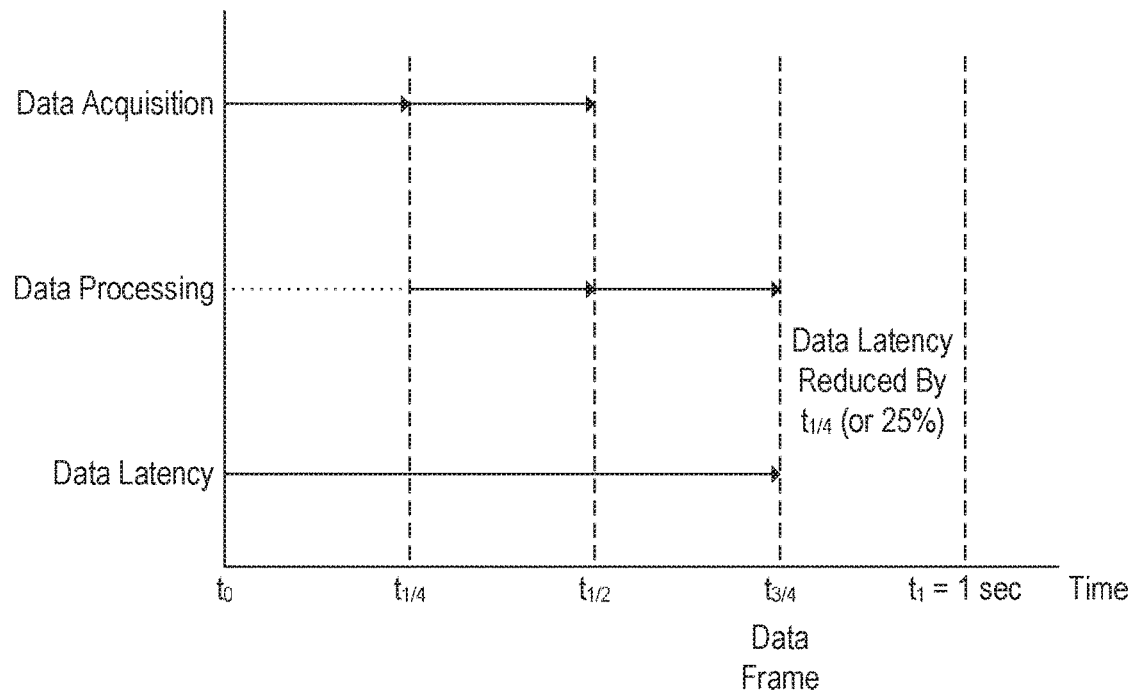
FIG. 3B illustrates another example diagram, according to various embodiments of the current disclosure.

FIG. 3B illustrates another example diagram 320, according to various embodiments of the current disclosure. Here, the example diagram 320 depicts a scenario in which a user has selected a data frame to be segmented into two incremental data of equal data length. Similar to FIG. 3A, the data acquisition time and the data processing time for a full data frame are still $t_{1/2}$. In this example diagram 320, since there are two incremental data in each data frame, the acquisition time for each incremental data is, accordingly, $t_{1/4}$ (e.g., 0.25 seconds). Since a first incremental data can be outputted at $t_{1/4}$, this first incremental data can be immediately processed while a second incremental data is being currently acquired (e.g., parallel processing). By taking advantage of this parallel processing, a full data frame can be outputted at $t_{3/4}$ (e.g., 0.75 seconds), instead of the usual time of $t_1$—an overall improvement of 25 percent over the example diagram of FIG. 3A. Therefore, the data latency of the LiDAR system in this scenario is 0.75 seconds. In this example diagram 320, the throughput of the LiDAR system is one processed data frame for every 0.75 seconds, or 1.33 Hz.

Figure 3C:
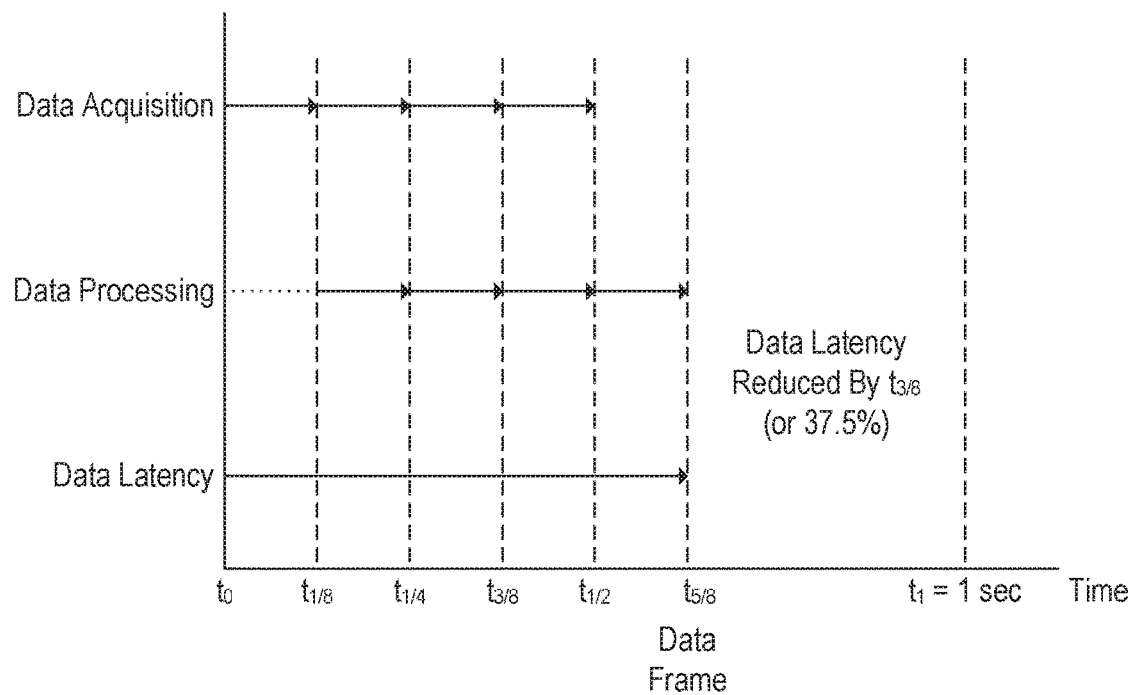
FIG. 3C illustrates another example diagram, according to various embodiments of the current disclosure.

FIG. 3C illustrates another example diagram 340, according to various embodiments of the current disclosure. Here, the example diagram 340 depicts a scenario in which a user has selected a data frame to be segmented into four incremental data of equal data length. Similar to FIG. 3A, the data acquisition time and the data processing time for a full data frame is still $t_{1/2}$. In this example diagram 340, there are four incremental data in each data frame, the acquisition time for each incremental data is, accordingly, $t_{1/8}$ (e.g., 0.125 seconds). Since a first incremental data can be outputted at $t_{1/8}$, this first incremental data can be immediately processed while a second incremental data is being currently acquired (e.g., parallel processing). By taking advantage of this parallel processing, a full data frame can be outputted at $t_{5/8}$ (e.g., 0.625 seconds), instead of the usual time of $t_1$—an overall improvement of 37.5 percent over the example diagram of FIG. 3A. Therefore, the data latency of the LiDAR system in this scenario is 0.625 seconds. In this example diagram 340, the throughput of the LiDAR system is one processed data frame for every 0.625 seconds, or 1.6 Hz.

It is of note that the data latency of the scenario depicted in FIG. 3C is an improvement over the data latency of the scenario depicted in FIG. 3B. This improvement is purely due to the extent of the parallel processing. Whereas in FIG. 3B, the parallel processing occupies a third (e.g., $t_{1/3}$) of the data latency (e.g., $t_{3/4}$) of a data frame, in FIG. 3C, the processing occupies a three-fifth (e.g., $t_{3/8}$) of the data latency (e.g., $t_{5/8}$) of a data frame.

It is also of note that as the incremental data becomes smaller and smaller in data length (or number of incremental data segments increases), the data latency or the throughput of the data acquisition system improves. Many variations are possible. For example, a data frame can be segmented, divided, or split into ten incremental data. In another example, the data frame can be segmented, divided, or split into twelve incremental data.

Figure 4:
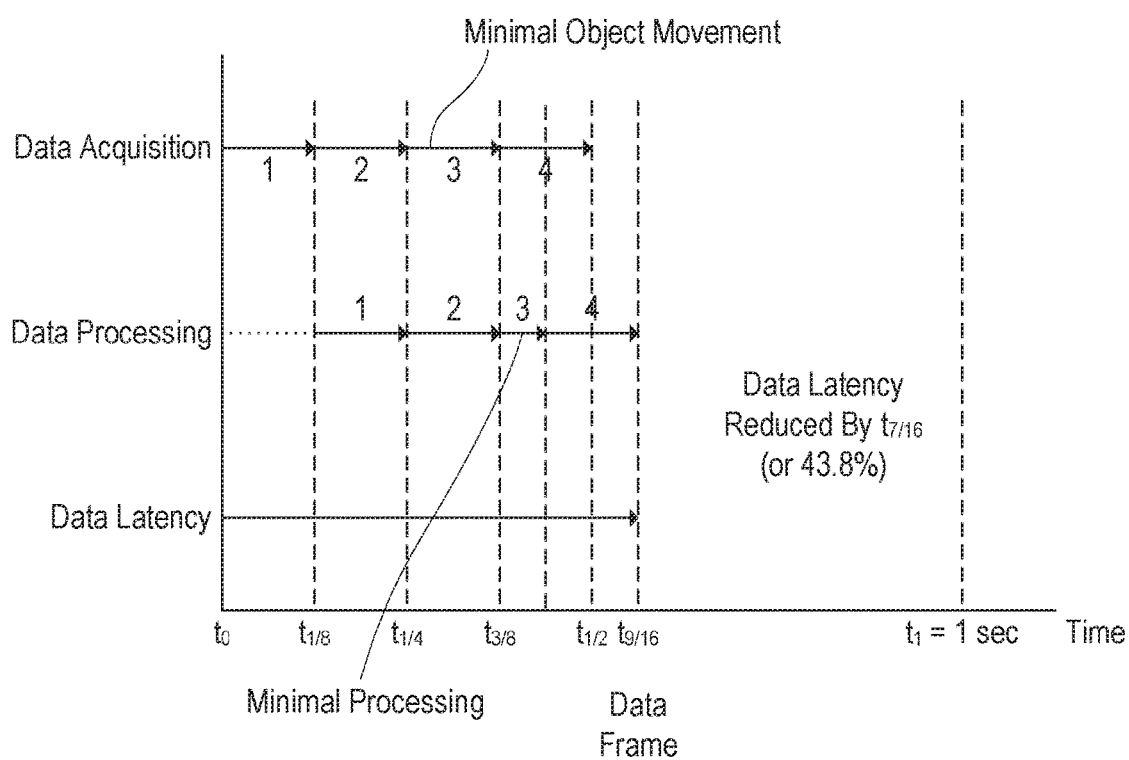
FIG. 4 illustrates another example diagram, according to various embodiments of the current disclosure.

FIG. 4 illustrates another example diagram 400, according to various embodiments of the current disclosure. Here, the example diagram 400 depicts a scenario in which a user has selected a data frame to be segmented into four incremental data of equal data length. Further, in this example diagram 400, in a previous data frame, a motion analysis engine (e.g., such as the motion analysis engine 212 of FIG. 2) has determined that objects identified in a third incremental data of the previous data frame had not moved between data frames. Moreover, in this example diagram 400, the motion analysis engine has instructed an incremental data processing engine (e.g., such as the incremental data processing engine 210 of FIG. 2) to minimally process the third incremental data in the current data frame. Because the third incremental data does not need to be processed fully, data processing time and overall data latency can be further reduced. For example, time to fully process an incremental data is tug (e.g., 0.125 seconds) and time to minimally process the incremental data is half of that, or $t_{1/16}$ (e.g., 0.0625 seconds). In this example, if the third frame is minimally processed, the data latency of the LiDAR system can be further reduced down to $t_{9/16}$ (e.g., 0.5625 seconds)—an improvement of 43.8 percent over the example diagram of FIG. 3A. In this example diagram 400, the throughput of the LiDAR system is one processed data frame for every 0.5625 seconds, or 1.78 Hz.

Figure 5:
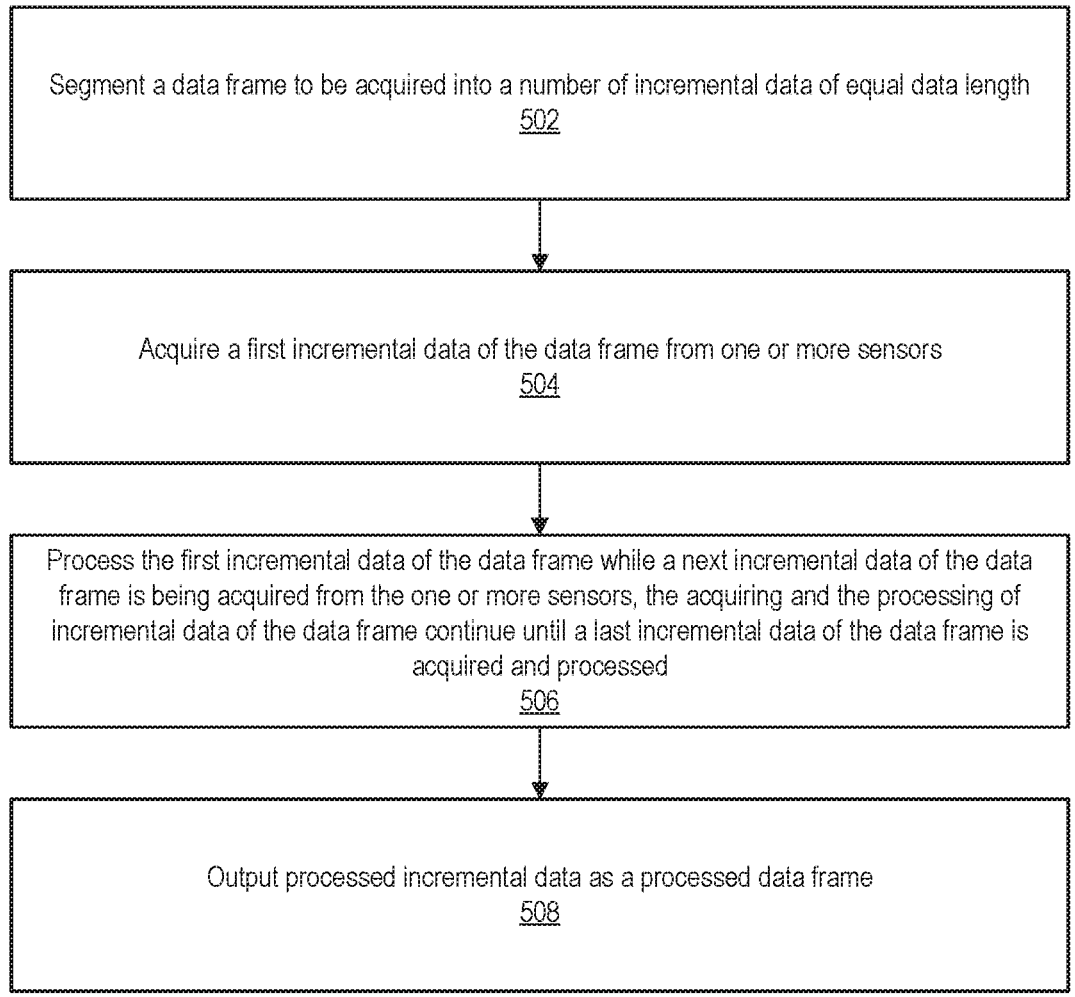
FIG. 5 illustrates an example method, according to various embodiments of the current disclosure.

FIG. 5 illustrates an example method 500, according to various embodiments of the current disclosure. The method 500 may be implemented in various environments including, for example, the environment 200 of FIG. 2. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a data frame to be acquired is segmented into a number of incremental data of equal data length. At block 504, a first incremental data of the data frame is acquired from one or more sensors. At block 506, the first incremental data of the data frame is processed while a next incremental data of the data frame is being acquired from the one or more sensors. The acquiring and the processing of incremental data of the data frame continue until a last incremental data of the data frame is acquired and processed. At block 508, processed incremental data is outputted as a processed data frame.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
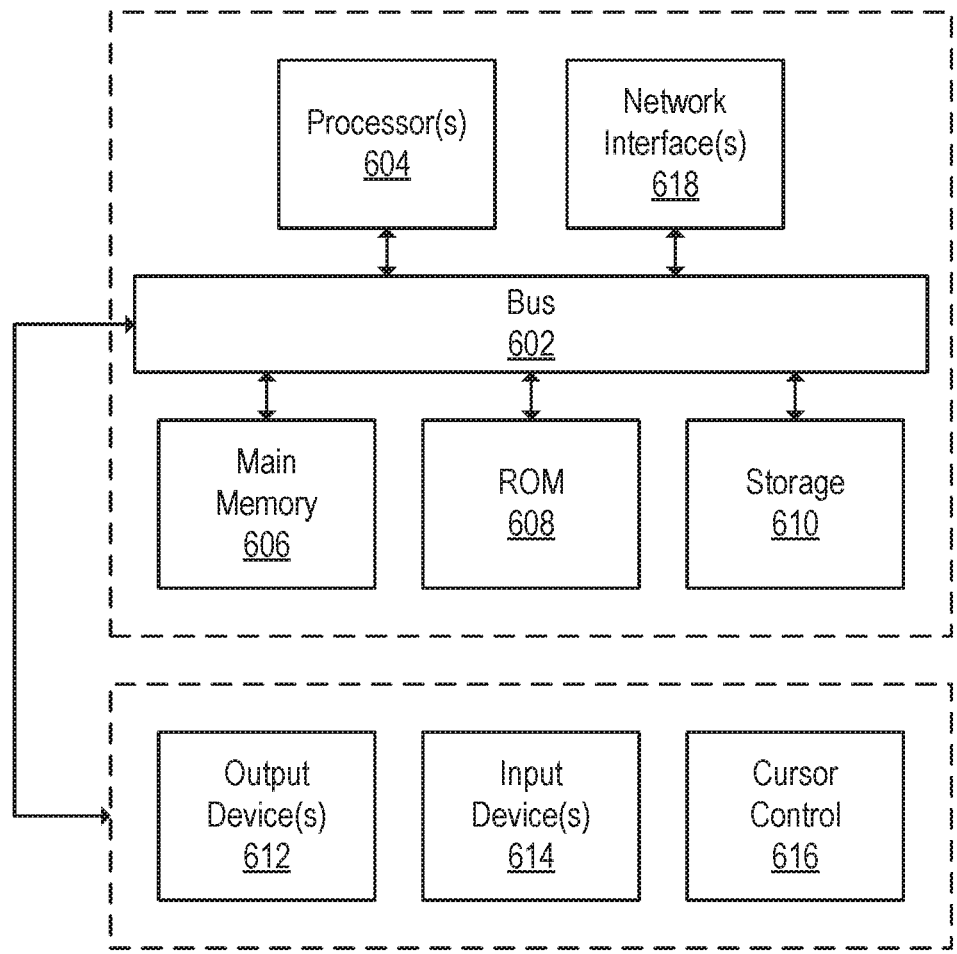
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
acquiring, by one or more sensors on a vehicle, a data frame, wherein: the one or more sensors includes a Lidar; and the Lidar rotates about an axis of the vehicle;
segmenting, by one or more computing processors, the data frame to be acquired into a number of incremental data of equal data length, wherein each of the incremental data of the data frame corresponds to an arc of a 360 degree scan, the arc being proportional to a ratio of the incremental data to the data frame;
processing, by the one or more computing processors, a first incremental data of the data frame while a next incremental data of the data frame is being acquired from the one or more sensors, the acquiring and the processing of incremental data of the data frame continuing until a last incremental data of the data frame is acquired and processed;

identifying an object in the first incremental data of the data frame;

identifying the object in a first incremental data of a second data frame;

determining a relative movement of the object from the data frame to the second data frame;

processing a first incremental data of a third data frame based on the relative movement of the object to reduce a data processing time and improve latency;

reconstructing the third data frame based on the processing of the first incremental data of the third data frame to reduce a file size of the third data frame; and outputting, by the one or more computing processors, processed incremental data of the reconstructed third data frame as a processed data frame.

2. The method of claim 1, wherein segmenting the data frame to be acquired into the number of the incremental data is user selectable.

3. The method of claim 1, wherein the processed data frame is a three dimensional map of an environment, the three dimensional map comprises relative distances between the object and a second object in the environment.

4. The method of claim 1, further comprising:
identifying, using one or more machine learning techniques, the object in the incremental data of the data frame;
detecting the amount of movement in the object from the first incremental data to the next incremental data using the one or more machine learning techniques; and
analyzing, using the one or more machine learning techniques, the object with a corresponding object from a previous incremental data of a previous data frame to determine relative motion of the object.

5. The method of claim 4, wherein the analyzing the object with a corresponding object from a previous incremental data further comprises:
identifying the corresponding object from the previous incremental data of the previous data frame;
determining, using one or more indicators and using one or more machine learning techniques, relative movements between the corresponding object to the object between data frames; and
identifying, based on the relative movements, one or more incremental data to be minimally processed in a next data frame to be acquired.

6. The method of claim 4, wherein analyzing the one or more objects with the previously identified objects from the previous incremental data of the previous data frame to determine relative motion of the one or more objects further comprises:
identifying the corresponding object from the previous incremental data of the previous data frame;
determining, using one or more indicators and using one or more machine learning techniques, the object has not moved between data frames; and
identifying one or more incremental data to bypass processing in a next data frame to be acquired.

7. The method of claim 1, wherein outputting processed incremental data as a processed data frame further comprises:
reassembling one or more processed incremental data of the data frame into the processed data frame.

8. The method of claim 1, wherein the processing of the first incremental data of the third data frame is based on whether the object is approaching or becoming more distant from the data frame to the second data frame.

9. The method of claim 1, wherein the processing the first incremental data of the third data frame further comprises diverting, to at least one other system of the vehicle, a processing power that is determined to no longer be needed to process the first incremental data of the third data frame based on the relative movement of the object.

10. A system comprising:
one or more sensors including a Lidar on a vehicle, wherein the Lidar rotates about an axis of the vehicle;
one or more processors; and
a memory storing instructions that, when executed by the one or more processors, cause the system to perform:
acquiring, by the one or more sensors, a data frame;
segmenting, by the one or more processors, the data frame to be acquired into a number of incremental data of equal data length, wherein each of the incremental data of the data frame corresponds to an arc of a 360 degree scan, the arc being proportional to a ratio of the incremental data to the data frame;
processing, by the one or more processors, a first incremental data of the data frame while a next incremental data of the data frame is being acquired from the one or more sensors, the acquiring and the processing of incremental data of the data frame continuing until a last incremental data of the data frame is acquired and processed;
identifying an object in the first incremental data of the data frame;
identifying the object in a first incremental data of a second data frame;
determining a relative movement of the object from the data frame to the second data frame;
processing a first incremental data of a third data frame based on the relative movement of the object to reduce a data processing time and improve latency;
reconstructing the third data frame based on the processing of the first incremental data of the third data frame to reduce a file size of the third data frame; and
outputting, by the one or more computing processors, processed incremental data of the reconstructed third data frame as a processed data frame.

11. The system of claim 10, wherein segmenting the data frame to be acquired into the number of the incremental data is user selectable.

12. The system of claim 10, wherein the instructions further cause the system to perform:
identifying, using one or more machine learning techniques, the object in the incremental data of the data frame; and
analyzing, using the one or more machine learning techniques, the object with a corresponding object from a previous incremental data of a previous data frame to determine relative motion of the object.

13. The system of claim 12, wherein the analyzing the object with a corresponding object from a previous incremental data further comprises:
identifying the corresponding object from the previous incremental data of the previous data frame;
determining, using one or more indicators and using one or more machine learning techniques, relative movements between the corresponding object to the object between data frames; and identifying, based on the relative movements, one or more incremental data to be minimally processed in a next data frame to be acquired.

14. A non-transitory computer readable medium comprising instructions that, when executed, cause one or more processors to perform:
acquiring, by one or more sensors on a vehicle, a data frame, wherein: the one or more sensors includes a Lidar; and the Lidar rotates about an axis of the vehicle;
segmenting the data frame to be acquired into a number of incremental data of equal data length, wherein each of the incremental data of the data frame corresponds to an arc of a 360 degree scan, the arc being proportional to a ratio of the incremental data to the data frame;
processing, by the one or more computing processors, the first incremental data of the data frame while the next incremental data of the data frame is being acquired from the one or more sensors, the acquiring and the processing of incremental data of the data frame continuing until a last incremental data of the data frame is acquired and processed;
identifying an object in the first incremental data of the data frame;
identifying the object in a first incremental data of a second data frame;
determining a relative movement of the object from the data frame to the second data frame;
processing a first incremental data of a third data frame based on the relative movement of the object to reduce a data processing time and improve latency;
reconstructing the third data frame based on the processing of the first incremental data of the third data frame to reduce a file size of the third data frame; and
outputting, by the one or more computing processors, processed incremental data of the reconstructed third data frame as a processed data frame.

15. The non-transitory computer readable medium of claim 14, wherein segmenting the data frame to be acquired into the number of the incremental data is user selectable.

16. The non-transitory computer readable medium of claim 14, wherein the instructions further cause the system to perform:
identifying, using one or more machine learning techniques, the object in the incremental data of the data frame;
detecting the amount of movement in the object from the first incremental data to the next incremental data using the one or more machine learning techniques; and
analyzing, using the one or more machine learning techniques, the object with a corresponding object from a previous incremental data of a previous data frame to determine relative motion of the object.

17. The non-transitory computer readable medium of claim 16, wherein the instructions further cause the system to perform:
identifying the corresponding object from the previous incremental data of the previous data frame;
determining, using one or more indicators and using one or more machine learning techniques, relative movements between the corresponding object to the object between data frames; and
identifying, based on the relative movements, one or more incremental data to be minimally processed in a next data frame to be acquired.

* * * * *